United States Patent
Clark et al.

(10) Patent No.: US 10,924,298 B2
(45) Date of Patent: Feb. 16, 2021

(54) NETWORK SERVICE CHAIN CONSTRUCTION

(71) Applicant: HEWLETT PACKARD ENTERPRISE DEVELOPMENT LP, Houston, TX (US)

(72) Inventors: Charles F. Clark, Roseville, CA (US); Duane E. Mentze, Roseville, CA (US); Shaun Wackerly, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/507,629

(22) PCT Filed: Feb. 11, 2015

(86) PCT No.: PCT/US2015/015474
§ 371 (c)(1),
(2) Date: Feb. 28, 2017

(87) PCT Pub. No.: WO2016/130121
PCT Pub. Date: Aug. 18, 2016

(65) Prior Publication Data
US 2017/0302470 A1   Oct. 19, 2017

(51) Int. Cl.
*H04L 12/40* (2006.01)
*H04L 12/24* (2006.01)
*H04L 12/70* (2013.01)

(52) U.S. Cl.
CPC ........ *H04L 12/40143* (2013.01); *H04L 41/00* (2013.01); *H04L 41/0893* (2013.01); *H04L 2012/5626* (2013.01)

(58) Field of Classification Search
CPC .......... H04L 41/0893; H04L 12/40143; H04L 41/00; H04L 2012/5626
See application file for complete search history.

(56) References Cited

U.S. PATENT DOCUMENTS

| | | | |
|---|---|---|---|
| 8,693,344 B1 * | 4/2014 | Adams | H04L 41/0893 370/241 |
| 8,752,002 B2 | 6/2014 | Banavar et al. | |
| 8,817,625 B1 | 8/2014 | Zhang et al. | |
| 10,142,254 B1 * | 11/2018 | Olofsson | H04L 45/64 |

(Continued)

OTHER PUBLICATIONS

"Chapter 66: Configuring Dynamic Access Policies," 2010, pp. 66-1 to 66-30, Cisco Systems, Inc.

(Continued)

*Primary Examiner* — Charles E Anya
(74) *Attorney, Agent, or Firm* — Brooks, Cameron & Huebsch, PLLC (57) ABSTRACT

Example implementations relate to construction of a network service chain. For example, a system for construction of a network service chain can include a detection engine to detect a portion of a first network policy directing a subset of packets to a first service and a portion of a second network policy directing the subset of packets to a second service, and a construction engine to construct a network service chain of the first service and the second service in an order determined from a priority assigned to the first network policy and a priority assigned to the second network policy.

18 Claims, 6 Drawing Sheets

(56) References Cited

U.S. PATENT DOCUMENTS

| | | | |
|---|---|---|---|
| 2003/0187992 A1* | 10/2003 | Steenfeldt | H04L 29/06 709/227 |
| 2009/0177512 A1 | 7/2009 | Dogan et al. | |
| 2010/0054208 A1* | 3/2010 | Kojima | H04W 76/11 370/331 |
| 2010/0054241 A1* | 3/2010 | Shah | H04L 45/00 370/389 |
| 2012/0166604 A1 | 6/2012 | Fortier et al. | |
| 2013/0124708 A1 | 5/2013 | Lee et al. | |
| 2013/0272305 A1 | 10/2013 | Lefebvire et al. | |
| 2013/0329559 A1* | 12/2013 | Cabrera | H04W 28/0289 370/235 |
| 2014/0351452 A1* | 11/2014 | Bosch | H04L 67/10 709/242 |
| 2015/0188770 A1* | 7/2015 | Naiksatam | H04L 41/0893 370/254 |
| 2015/0222640 A1* | 8/2015 | Kumar | H04L 47/782 370/230 |
| 2016/0164776 A1* | 6/2016 | Biancaniello | H04L 45/306 |

OTHER PUBLICATIONS

Antonio Manzalini et al., "Software-Defined Networks for Future Networks and Services," White Paper, Jan. 29, 2014, pp. 1-16, IEEE, Available at: <sites.ieee.org/sdn4fns/files/2014/02/White-Paper-IEEE-SDN4FNS-2014_02_05.pdf>.

Dr. Jim Metzler, "The 2015 Guide to SDN and NFV: Part 2: Network Functions Virtualization (NFV)," Nov. 19, 2014, pp. 1-50, Available at: <webtorials.com/main/resource/papers/webtorials/2015-Guide-to-SDN-and-NFV/2015_Guide_Chapter_2.pdf>.

Federica Paganelli et al., "Context-Aware Service Composition and Delivery in NGSONs over SDN," Communications Magazine, Aug. 2014, pp. 97-105, vol. 52, Issue 8, IEEE.

International Search Report and Written Opinion, International Application No. PCT/US2015/015474, dated Nov. 12, 2015, pp. 1-9, KIPO.

Min Luo, "Intelligent Control and Management for SDN-Openflow Networks," Sep. 10, 2013, pp. 1-30, Huawei Technologies Co., Ltd.

* cited by examiner

NETWORK SERVICE CHAIN CONSTRUCTION

BACKGROUND

Networks can include a plurality of resources connected by communication links, and can be used to connect people, provide services (e.g., internally and/or externally via the Internet and/or intranet), and/or organize information, among other activities associated with an entity. An example network can include a software-defined network (SDN).

DETAILED DESCRIPTION

Networks can include a plurality of resources such as databases and/or endpoint devices connected by communication links, and can be used to connect people, provide services (e.g., internally and/or externally via the Internet and/or intranet), and/or organize information, among other activities. Examples of endpoint devices include computers, tablets, phones, printers, cameras, door locks, HVAC controller, among other endpoint devices capable of operating on a network. An example network can include a software-defined network (SDN).

SDN controllers can direct network devices such as servers and/or computing devices on how to forward network traffic based on the input from various applications. Applications might simulate services on the network. Applications might be observing traffic in the network, such as with security applications, and so forth. For instance, one application can look for infected hosts on the network, while another application may attempt to optimize voice over internet protocol (VoIP) calls on the network. Both applications may run on the same SDN controller, and use the SDN controller to communicate down to network devices in a native format. As used herein, a native format refers to a data format specific to a particular application. A native format can also be referred to as a protocol-specific format.

When applications within a network, such as an SDN, want to tell the same devices in the network what to do, a conflict may arise and in some cases, neither application may be permitted to instruct the devices. Further, as both applications may communicate with the devices using native protocols, additional difficulty may result in executing the actions of the protocols. In such instances, the SDN controller may be unable to determine which actions from which applications should be executed, and/or if the actions of both applications should be executed.

Also, network policies may be applied within the network, such as an SDN, and may be applied by particular protocols such as Access Control Lists (ACLs) and/or Open-Flow. These policies can be codified into the protocol-specific format, then input to an individual network component or a SDN controller. As used herein, a policy can refer to a set of match criteria with an accompanying action which should be taken on matching network traffic. When the policy space (e.g., set of matching network packets) of two policies overlaps, a network administrator may be left to decide which policy should be applied to the overlapping space. The overlapping policy which is not selected by the network administrator is either left unapplied for the overlapped policy space or is rejected entirely. Further, when an SDN controller is used, the SDN controller may automatically perform the policy selection task that was above performed by a network administrator. The network controller may then coordinate between policy requests from various applications and provide information to those applications about whether or not their policies have been applied. In some cases, the applications are neither aware of each other nor are they capable of coordinating to resolve policy conflicts. For example, if a network administrator has two policies, one to monitor traffic from suspicious hosts, and one to optimize traffic for VoIP phone calls, then the administrator may have to select whether traffic monitoring or optimization of VoIP phone calls is higher priority.

Additionally, network policies may be both dynamically applied and may indicate redirection to a service chain. As used herein, a service can refer to a virtual and/or physical network functionality. The service can include an application running at a network application layer and above that provides for the storage, manipulation, inspection, presentation, communication and/or other processing of data such as network traffic. For example, a service can include packet filtering, load balancing, transactional proxies, deep packet inspections, virus detection, spam detection, phishing detection, or any other type of network capability (e.g., executed as a virtual machine controlled by a hypervisor, etc.) that can be physically and/or virtually inserted into a flow of network packets. As used herein, a service chain can refer to a plurality of the network services that are configured in a particular order and/or grouping. That is, a service chain can include a plurality of services that are chained. Put another way, a service chain can refer to a plurality of services that are grouped, assigned an execution order for a network flow, and/or virtually interconnected through a network to support an application, among other examples.

A network policy may be both dynamically applied and indicate redirection of a network packet to a service chain where, for example, it indicates that certain types of network packets are to be sent to a packet inspection service and that the policy is only applicable during specified working hours. As used herein, an inspection service can refer to a collection of network functions that perform inspection of network packets. If another policy applicable to the same network traffic indicates that packets should be sent to a logging service at all hours of the day, then a network administrator may configure two service chains. In this example, the network administrator may configure one service chain including directing network traffic to the inspection service and to the logging service (e.g., to be applied during the specified working hours). The network administrator may configure a second service chain including directing the network traffic to the logging service alone (e.g., to be applied during non-working hours).

Continuing the above example, a third network policy indicating redirection of the network packet to a third service would result in a total of four configured service chains, each applicable during different parts of the day.

Further, where a number of network policies (N) each utilize a different service and are applicable at non-overlapping times, there may be $2^{N-1}$ service chains to be configured by a network administrator.

In contrast, examples herein relate to network service chain construction. Network service chain construction, in accordance with the present disclosure, can include detection of portions of a first and second network policy directing a subset of packets to a corresponding first and second service, and construction of a network service chain of the first and second services in an order determined from priorities assigned to the first and second network policy.

Figure 1:
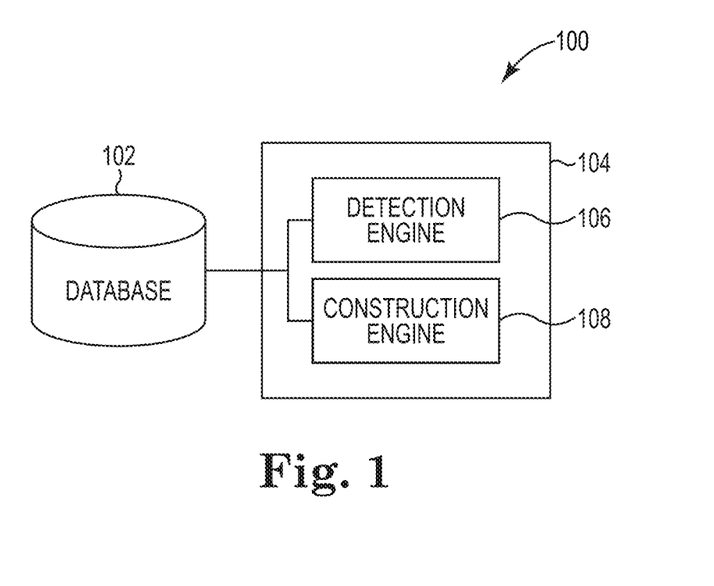
FIG. 1 illustrates a diagram of an example of a system according to the present disclosure.
Figure 2:
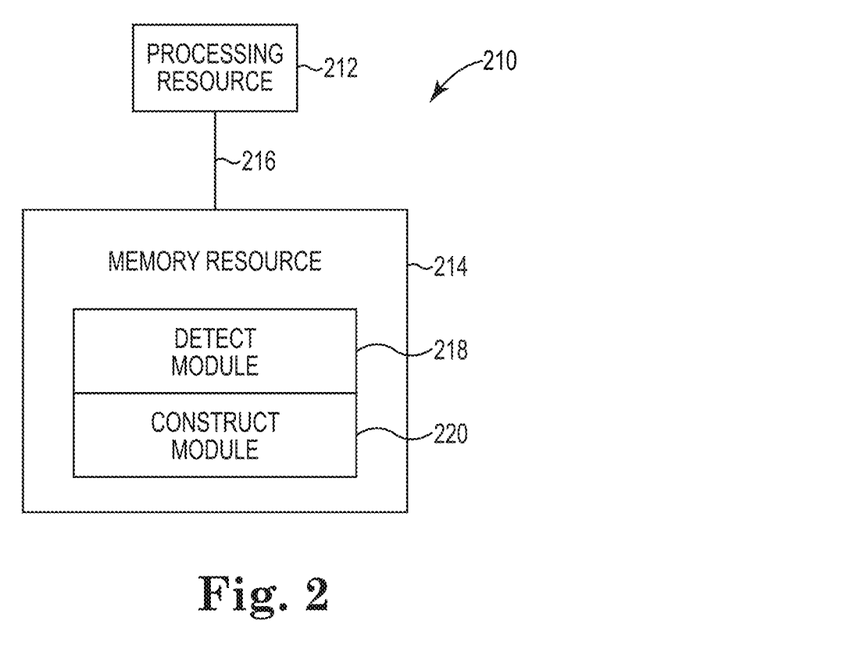
FIG. 2 illustrates a diagram of an example computing device according to the present disclosure.

FIGS. 1 and 2 illustrate examples of systems 100, 210 according to the present disclosure. That is, FIG. 1 illustrates a diagram of an example of a system 100 according to the disclosure. The system 100 can include a database 102, a subsystem 104, and/or a number of engines 106 and 108. The subsystem can include the number of engines in communication with the database 102 via a communication link. The system can include additional or fewer engines than illustrated to perform the various functions described herein. The system can represent instructions and/or hardware of a network controller (e.g., system 210 as referenced in FIG. 2, etc.).

The number of engines 106 and 108 can include a combination of hardware and programming to perform functions including those described herein (e.g., detect a portion of a first network policy directing a subset of packets to a first service and a portion of a second network policy directing the subset of packets to a second service, construct a network service chain of the first service and the second service in an order determined from a priority assigned to the first network policy and a priority assigned to the second network policy, etc.). The instructions can include instructions (e.g., software, firmware, etc.) stored in a memory resource (e.g., computer readable medium (CRM), machine readable medium (MRM), etc.) as well as hard-wired program (e.g., logic).

The detection engine 106 can include hardware and/or a combination of hardware and instructions to detect overlapping portions of network policies. In accordance with examples of the present disclosure, policies can be expressed via an intent format by applications, rather than a native format like ACLs and/or OpenFlow. As used herein, an intent format refers to an expression of a network policy, defined by a classifier of network traffic, a context of the network traffic, an action to be taken on the network traffic, a network traffic source endpoint identifier, and a network traffic destination endpoint identifier, as discussed further herein. In other words, each network policy can have a classifier, context, action, source endpoint identifier and destination endpoint identifier which collectively define the intent format of the network policy. An ACL, as used herein, can refer to a list of permissions that are used for filtering traffic based on a given filtering criteria on a router or switch interface. Examples of conditions supplied by the ACL, can include allow, block, and/or remark differentiated services code point (DSCP). OpenFlow, as used herein, can refer to a communication protocol that gives access to a data plane of a network (e.g., an SDN). OpenFlow can perform a plurality of actions within the network, such as enable remote controllers (e.g., SDN controllers) to determine the path of network packets through a network of switches, classify network traffic, and apply network policy actions, among other actions.

Detecting the overlapping portions of network policies can include compiling a plurality of network policies, an administrator may define the network policies and through some special application such as a graphical user interface (GUI) or scriptable interface. For instance, the administrator may define a classifier, a context, various actions, and source and/or endpoint identifiers for a particular network policy.

Each action type may be defined, such as before policy compilation, with the following criteria for that action type: First, is the action composable? Meaning, can the action be composed and/or combined with other actions? Second, is the action an observer? Meaning, does the action modify the packet of network traffic, or does the action leave the packet unmodified? Third, does the action allow duplicates? Meaning, can two actions of the same type be performed on the same packet? For instance, two 'redirect' actions may not be executed on the same packet, but two latency settings may be enforced on the same packet since one latency setting may guarantee the other. Fourth, what is the action precedence? Meaning, what is the priority of the action relative to other actions, for resolving conflicts?

As used herein, a classifier can refer to a particular type of network traffic, a particular type of device to and/or from which the network traffic is routed, and/or any other type of identifier which can categorize traffic within the network. For instance, a classifier can include a combination of logical expressions involving an IP protocol, an ethernet type, an L4 source port, among other types of expressions. If the particular classifier "matches" network traffic, the network traffic includes a property that is defined by the classifier of the network policy. In some examples, the classifier of the network policy can be a collection of expressions (e.g., logical expressions). In such examples, if any expression in the collection of expressions matches the network traffic, the entire classifier can be a match. For instance, an administrator of a network can specify a network policy that has a classifier of "user datagram protocol (UDP) and port 67". In such an instance, the classifier is specifying that the policy relates to any UDP traffic that is also for port 67, and the classifier of "UDP and port 67" may be referred to as an expression. An example of a collection of expressions can include "UDP source port 67 or transmission control protocol (TCP) port 59", where each of the phrases "UDP port 67" and "TCP port 59" can be an example of an expression. When any packet of traffic within the network includes "UDP port 67" or "TCP port 59", then the packet of traffic is considered to "match" the classifier.

In another example, the classifier of the network policy can be a collection of terms. In such an example, if all terms in the expression match the network traffic, the entire expression can be a match. For instance, an administrator of the network can specify a classifier having a collection of terms such as, "UDP source port 67, destination port 71", and the network traffic would have to match each of the terms in the classifier to be considered a match.

In yet another example, the classifier of the network policy can be a collection of terms, and each term can be a collection of single values and intervals. For instance, an administrator of the network can specify a classifier having a collection of terms such as, "UDP source port 67 and destination port," and values representing the destination port can be provided, such as 68, 69, and 71. If data in the network traffic falls within any interval or matches any single value, the entire term can be a match.

As used herein, a context of network traffic can refer to a global condition or a plurality of global conditions during which the network policy should apply. A context of network traffic can be a time of day, and/or a system state among other conditions. For example, a context of network traffic can state that between the hours of 5 pm and 7 am, all endpoint devices within the network should take a particular action. In another example, a context of network traffic can state that when the network is under a malicious security attack, all endpoint devices are prohibited from taking particular actions.

As used herein, a source endpoint identifier refers to a numerical, alpha, and/or alpha numerical value that identifies a source of network traffic and/or a group of sources of network traffic. A source endpoint identifier can refer to more than a single source. For example, a source endpoint identifier can be a range of internet protocol (IP) addresses, or all employee endpoints. Similarly, a destination endpoint identifier refers to a numerical, alpha, and/or alpha numerical value that identifies a destination endpoint of the network traffic and/or a group of destination endpoints of network traffic. Further, a destination endpoint identifier can refer to more than a single destination. For example, a destination endpoint identifier can be a range of IP addresses, or all employee endpoints. Both source endpoint identifiers and destination endpoint identifiers can identify particular devices within the network, as well as particular users within network. For example, a source endpoint identifier and/or a destination endpoint identifier can specify that the policy pertains to all employees within the network. Similarly, a source endpoint identifier and/or a destination endpoint identifier can specify that the policy pertains to any employees that share a common trait, such as, being in a particular physical location. In another example, a source endpoint identifier and/or a destination endpoint identifier can specify that the network policy pertains to only employees, and/or only non-infected hosts within the network. While examples are provided herein, describing source endpoint and destination endpoint identifiers, examples are not so limited, and other identifiers can be provided that identify the group and/or groups to which a network policy applies.

As used herein, a network action refers to a resulting action or resulting actions which should be applied to all traffic within the policy space of the network policy. For instance, a specific packet or subset of packets on the network is within the policy space of the network policy if the packet matches the classifier, is from an source in the source group(s), is to an endpoint in the endpoint group(s), and the packet occurs during the conditions specified by the context.

As used herein, an action refers to actions and/or treatments to be applied to network communication (e.g., network traffic) between destination groups. Example actions can include: allow, redirect, inject, inspect, audit, log, latency, bandwidth, loss, and block, among other actions. The action "allow" refers to a command that permits communication between destination groups. The action "redirect" refers to a command to encapsulate and send the packet to a particular service, as an alternate destination. The action "inject" refers to a command to insert a new packet and forward it onto the network. The action "inspect with" refers to a command to encapsulate and send the packet through a service chain, on its way to the final destination. The action "audit" refers to a command to send encapsulated copies of the packet to a particular service. The action "log" refers to a command to collect statistics on a particular section of network traffic. The action "latency" refers to a command to deliver the network packet and/or network packets after a specified delay period. The action "bandwidth" refers to a command to limit the rate of communication within the network to within a specified bandwidth. The action "loss" refers to a command to allow only a specified portion of the traffic to be lost. Additionally, the action "block" refers to a command to deny a particular communication within the network.

In some examples, the action can include an indication to direct/redirect network traffic to a service. That is a network policy can include a network action that specifies redirection of matching packets to a specific network service. In some examples, the network policy can indicate a specific instance of a service. A specific instance of a service can include a specific implementation of a number of implementations of the service. The implementations can be essentially functionally identical but can utilized and/or be supported by different resources of the network. For example, an instance of a service can include a specific implementation of a service that is served by a particular server that can be a different server than is serving other implementations of the service. Additionally and/or alternatively the network policy can include a broader indication of a service. For example, the network policy can specify a service type. Specifying a service type can include requesting an implementation and/or any of a group of implementations of a service of a specific type and/or category. For example, the network policy can indicate a network action including send all traffic within the policy space to inspection service A-1 (e.g., "inspect with A-1") and/or the network policy can indicate a network action including send all traffic within the policy space to an inspection service, of which there are three instances A-1, A-2, and A-3 (e.g., "inspect with A").

In some examples, detecting overlapping portions of network policies can include analyzing a set of compiled active network policies. Analyzing can include specifying whether each of the network policies are exclusive or not, referring to whether or not the network policy can be enforced and/or applied in combination with other policies. Each application within the network can specify whether a particular policy executed by the application can be enforced in combination with other policies, or if the network policy must be applied by itself. For example, a network security application might specify that a particular security policy can be applied with other policies, such as policies enforced by a Voice over IP (VoIP) application. The exclusivity designation for each policy can be used to detect and resolve conflicts between network policies.

In some examples, detecting overlapping portions of network policies can include analyzing a set of compiled active network policies. This can include recognizing and/or specifying an application priority. An application priority can be a list specifying an order with which particular network policies should be applied. For instance, an administrator of the network can define an application priority, specifying an order of each application within the network, and which can be used to order the applications relative to one another. Similarly, each application can specify a network policy priority, which can be used to order the network policies of the particular application relative to other network policies for that particular application. The application priorities and policy priorities can be used to resolve a conflict between network policies. The network policy priorities can be normalized across applications. That is, the network policy priorities can include a relative and/or normalized designation of a priority level (e.g., low, medium, high, etc.) associated with the policy. Detecting overlapping portions of network policies can further include detecting a conflict between a first network policy among the plurality of network policies and a second network policy among the plurality of network policies, using the intent format. For instance, the classifier, context, action, source endpoint identifier, and/or destination endpoint identifier for each network policy can be compared against every other network policy, to determine if any policies have a similar intent format.

In an example, the policy space of the first network policy can be compared to the policy space of the second network policy space, in order to identify packets of network traffic that would be affected by both policies. In other words, the conflict detection engine can compare the first network policy space to the second network policy space and identify if the first and second network policy spaces overlap. As used herein, an "overlap" between network policies refers to at least two policies that would apply to a particular packet within the network traffic. For instance, a classifier for one policy (e.g., "policy A") can be "VLAN 5" and a classifier for another policy (e.g., "policy B") can be "port 6". In such an example, an overlap between policy A and policy B can exist when network traffic is going to and/or from both VLAN 5 and port 6. While the phrases "first" and "second" are used herein to denote different network policies, these designations are not intended to refer to any particular order, such as an order in time. In some examples, comparing the policies can include comparing the first network policy against all other network policies to identify conflicting policies.

Additionally, the policy space of the first network policy can be compared to the policy space of a third network policy. The first network policy and the third network policy can have overlapping applicability to particular packets within the network flow. The first network policy and the third network policy can direct these particular packets to a common service (e.g., they can both direct a subset of packets to a first service).

In some examples, detecting overlapping portions of network policies can include separating overlapping network policies into a plurality of non-overlapping policies, and resolve the detected conflict based on the plurality of non-overlapping policies. For example, with a set of N possibly overlapping network policies, the following may be used to derive a complete set of N+ orthogonal network policies to perform the functions of the overlapping network policies:

```
Set<Policy> getOrthogonalPolicies(Set<Policy> policies) {
    while (splitOverlappingPolicy(policies))
        ; // call until no splits occur
    return policies;
}
boolean splitOverlappingPolicy(Set<Policy> policies) {
    // Iterate over all policies in the set.
    // Replace the first overlap with orthogonal policies.
    Set<Policy> all = policies.deepCopy( );
    for (Policy p1: all) {
        // Remove p1 from the set we'll analyze
        all.remove(p1),
        // Check for overlap between p1 and the remainder of the set
        For (Policy p2 : all) {
            if (policiesOverlap(p1,p2)) {
                // Remove the two original policies from the set
                policies.remove(p1),
                policies.remove(p2),
                // Replace original policies with 3+ orthogonal policies
                policies.addAll( splitPolicies(p1,p2) ),
                return true;
            }
        }
    }
    // No overlaps were found
    return false;
}
```

For example, two overlapping network policies can be referred to as "Policy A" and "Policy B", respectively. The overlap between policy A and policy B can be converted into three orthogonal policies. For example, overlapping policies A and B could be converted to 3 orthogonal policy spaces, A&!B, A&B, and B&!A. As used herein, the nomenclature of "A&!B" means "A and not B". Similarly, "A&B" means "A and B", and "B&!A" means "B and not A". As such, in policy space A&!B, policy A would be enforced, and not policy B, in policy space A&B, policy A and policy B would be enforced, and in policy space B&!A, policy B would be enforced and not policy A. That is, each of the plurality of orthogonal policies would be classified as one of the following: an orthogonal network policy from the non-overlapping portion of policy A (e.g., A&!B), an orthogonal network policy from the non-overlapping portion of policy B (e.g., B&!A), or an orthogonal network policy from the overlap between policy A and policy B (e.g., A&B).

In each orthogonal policy space, an action and/or actions may be associated with the orthogonal policy space. For instance policy A, extending the example above, may have an action "inspect with service A" and policy B may have an action "inspect with service B". Network traffic in the policy space A&!B would have an action "inspect with service A", and network traffic in the policy space B&!A would have an action "inspect with service B". Similarly, network traffic in the policy space A&B would have an action "inspect with service A, B". Put another way, policy space A&B may get the action from A and the action from B.

In some examples, an orthogonal network policy may contain a conflict. For instance, in orthogonal policy space A&B, it may not be possible to execute both policy A and policy B. In such instances, the conflict between policies can be resolved by network policy priority. Each policy may be generated by a respective application within the network. For instance, an application such as a network security application may generate a plurality of policies, and a VoIP application may generate a plurality of policies. The network security application may assign a priority to each of the policies it has generated, and the VoIP application may assign a priority to each of the policies it has generated. Similarly, an administrator of the network may assign a priority to each of the applications within the network. For instance, the administrator may assign a higher priority to the network security application than to the VoIP application. In such a manner, a conflict between network policies may be resolved by comparing the priority assigned to one network policy to the priority assigned to the other network policy, and applying the network policy with the higher priority. As used herein, a policy with a higher priority refers to a policy that has a priority with a greater numerical value relative to another policy, and/or a priority that has a greater importance to the network relative to another policy.

Detecting overlapping portions of network policies can include detecting the portions of each of a plurality of network policies that overlap (e.g., portion of network policies that would apply to a particular subset of packets within the network traffic). This identification can be performed by analysis of a list of active overlapping network polices and/or an analysis of orthogonal network policies corresponding to portions of the plurality of network policies. Active network policies can include network polices that are actively enforced. For example, active network policies can include network polices that are being applied within the network and/or are actively applicable to network traffic. Each of a plurality of network policies may redirect matching packets to a specific service as specified in a corresponding network action of the policy. For example, detecting the overlapping portions of network policies can include detecting a portion of a first network policy specifying a network action such as a "redirect" of the subset of packets to a first service and detecting a portion of a second network policy specifying a network action such as a "redirect" of the same subset of packets to a second service. Additionally, as discussed above, each network policy and/or resulting orthogonal network policy can have a priority assigned to it. The priority can be assigned by a network administrator and/or a corresponding application.

The construction engine 108 can include hardware and/or a combination of hardware and instructions to construct a network service chain. Each of the network policies can be applicable to a subset of packets of network traffic as specified in the corresponding classifier. Each of the network policies can include a network action specifying a service to which the subset of packets of network traffic can be redirected. For the subset of packets corresponding to the policy space of the overlapping portion of the network polices, more than one network action can be applicable (e.g., the subset of packets can be redirected to distinct services). That is, overlapping portions of network policies can result in overlapping applicability of a network action to the subset of packets matching the classifier for the overlapping portions. Constructing a network service chain can include virtually chaining those network services specified in the network actions of the overlapping network policy portions. The network service chain can include an ordered chain of network actions and/or network services specified in the network actions of overlapping portions of network policies and/or corresponding orthogonal policies.

Constructing the network service chain can include constructing the chain of network services including a first network service and a second network service specified in the network action of overlapping portions of a first and a second network policy. The first and second services can be ordered within the chain. Ordering the first and second services can include chaining the first and second services together in a particular order so that, for example, a packet directed to the first and second services will be directed to the services in the particular order.

The order of the network services in the network service chain can be determined from a priority. For example, the order of a network service in the network service chain can be determined based on network policy priorities. In an example, a network service of the network service chain is associated with a network policy (e.g., is specified in a network action of the network policy) and that network policy can have a priority assigned thereto. Therefore, a network service's order in a network service chain can be determined based on the priority of the associated network policy. A first network service associated with a first network policy can be ordered earlier in the network service chain relative to a second network service associated with a second service policy based on the first network policy having a higher assigned priority level relative to the second network policy.

In an example, some services can be associated with a plurality of network policies. For example, a plurality of overlapping network service policies can include network actions specifying redirection of a subset of packets to the same service). The services associated with a plurality of network policies can be included in the network service chain in an order determined by the highest priority of any of the plurality of network policies that the network services is associated with. In an example, the network service can associated with three network service policies: policy A, policy B, and policy C, Each of the network service policies can be assigned network policy priorities as follows: policy A-High priority, policy B-Medium priority, and policy C-Low priority. The network service can be incorporated into a network service chain in an order determined from the priority of policy A since it that associated network policy has the comparatively highest priority within the policy space. Therefore, the network service associated with the plurality of policies can be ordered in a chain earlier than those network services associated with network policies having relatively lower priority than the highest priority assigned to the plurality of associated policies within the policy space. To reiterate, the ordering of the network services specified in a particular network policy space within a network service chain can be determined based on the relative priorities of the network policies of that policy space.

In an example where a portion of a first network policy and a portion of a third network policy direct a subset of packets to a common service, the ordering of the common service can be determined from a highest priority assigned among the first network policy and the third network policy. That is, ordering a service in a service chain where the service is requested by multiple policies can include ordering the service based on a highest priority network policy of the multiple policies of the policy space with which the service is associated.

The system 100 can additionally include a distribute engine can include hardware and/or a combination of hardware and instructions to distribute a subset of packets among a plurality of instances of a service. In an example, a single policy space can be split evenly into multiple orthogonal policies incorporating multiple instances of a service across which a subset of packets can be distributed. When more than one instance of a network service exists and that network service is specified in a network policy action, distributing the subset of packets can include balancing the load of network traffic matching that subset of packets across those network service instances. In some examples, the same network service can be provided by different servers and distributing the network traffic load can include approximately equalizing the applicable network traffic applied across the servers providing the network service. In an example, the selection of which server to include in a network service chain can be determined based on the match space of the policy, the expected traffic load of the policy, or the number of policies using a specific server. If multiple servers are available to provide a specific network service but a single network policy utilizes the service, the policy match space could be evenly split (e.g., into multiple virtual policies) to allow each policy to utilize a chain which uses a different server. The workload can thereby be evenly distributed across servers. The workload can include the flow of the subset of packets corresponding to the match space of the network policy. The distribution can also be an uneven distribution that sends a greater portion of the workload to a particular server. In some examples distribution of the workload can take into account the capability and resource availability of a particular service and can include scaling the workload of a particular server proportional to its ability to process the workload. Furthermore, as server availability changes, virtual policies can be constructed to match an active set of servers. That is, the network service chains can be modified to respond to a modification in the availability of an instance of a service and/or a server corresponding to a service.

FIG. 2 illustrates a diagram of an example computing device 210 according to the present disclosure. The computing device 210 can utilize instructions (e.g., software and/or firmware) hardware, and/or logic to perform a number of functions including those described herein. The computing device 210 can be a combination of hardware and program instructions configured to share information. The hardware, for example, can include a processing resource 212 and/or a memory resource 214 (e.g., CRM, MRM, database, etc.).

A processing resource 212, as used herein, can include a processor capable of executing instructions stored by a memory resource 214. Processing resource 212 may be implemented in a single device or distributed across multiple devices. The program instructions (e.g., computer readable instructions (CRI)) can include instructions stored on the memory resource 214 and executable by the processing resource 212 to implement a desired function (e.g., detect overlapping applicability among a plurality of network policies directing network traffic to corresponding network services).

The memory resource 214 can be in communication with a processing resource 212. A memory resource 214, as used herein, can include memory components capable of storing instructions that can be executed by processing resource 212. Such memory resource 214 can be a non-transitory CRM or MRM. Memory resource 214 may be integrated in a single device or distributed across multiple devices. Further, memory resource 214 may be fully or partially integrated in the same device as processing resource 212 or it may be separate but accessible to that device and processing resource 212. Thus, it is noted that the computing device 210 may be implemented on a participant device, on a server device, on a collection of server devices, and/or a combination of the user device and the server device.

The memory resource 214 can be in communication with the processing resource 212 via a communication link (e.g., a path) 216. The communication link 216 can be local or remote to a machine (e.g., a computing device) associated with the processing resource 212. Examples of a local communication link 216 can include an electronic bus internal to a machine (e.g., a computing device) where the memory resource 214 is one of volatile, non-volatile, fixed, and/or removable storage medium in communication with the processing resource 212 via the electronic bus.

A module and/or modules 218, 220 can include CRI that when executed by the processing resource 212 can perform a number of functions including those described herein. The number of modules 218, 220 can be sub-modules of other modules. For example, the detect module 218 and construct module 220 can be sub-modules and/or contained within the same computing device. In another example, the number of modules 218, 220 can comprise individual modules at separate and distinct locations (e.g., CRM, etc.).

Each of the number of modules 218, 220 can include instructions that when executed by the processing resource 212 can function as a corresponding engine as described herein. For example, the detect module 218 can include instructions that when executed by the processing resource 212 can function as the detection engine 106. In another example, the construct module 220 can include instructions that when executed by the processing resource 212 can function as the construction engine 108.

The detect module 218 can include instructions that when executed by the processing resource can detect overlapping applicability among a plurality of network policies directing network traffic to corresponding network services, as discussed in relation to FIG. 1. For example, detecting overlapping applicability among a plurality of network policies can include identifying portions of network policies with overlapping policy spaces. This can include detecting packets of network traffic that would be affected by both portions of the network policies with overlapping policy spaces. Detecting the overlapping applicability can include identifying network policies applicable to the same subset of network traffic based on the classifier, context, action, source identifier, and/or a destination identifier for each network policy. Further, detecting the overlapping applicability can also include identifying an orthogonal network policy corresponding to the overlapping area of network policies.

The construct module 220 can include instructions that when executed by the processing resource can construct a network service chain of each of the network services corresponding to each of the overlapping plurality of network policies, wherein each of the network services receives an order based on a priority ranking assigned to the corresponding overlapping network policy, as discussed in relation to FIG. 1. For example, a network service can be assigned an order within the network service chain that arranges that service relative to other services in the chain. The assigned position of the service relative to the other services in the chain can be determined based on the relationship of the network policy priority corresponding to the service relative to the network policy priority corresponding to the other services in the chain. That is, services in a chain can be ordered according to a relative ordering of their corresponding network policy priorities within the policy space.

The computing device 210 can include a module and/or modules including CRI that when executed by the processing resource 212 can cause the computing device 210 to construct a substitute network service chain, in response to a determination that the constructed network service chain was unsuccessful. A constructed network service chain can be determined to be unsuccessful where it is not an executable service chain. A constructed network service chain can be unsuccessful due to a defect in network resource topology and/or some other limitation of the service and/or their underlying structure and/or resources. A substitute network service chain can include a new and/or modified network service chain applicable to a subset of network traffic. The substitute network service chain can include additional or fewer actions and/or service than an original service chain. Constructing the substitute network service chain can be accomplished by removing a network service from the network service chain and/or generating a new network service chain without the network service. The removed and/or excluded network service can be a network service corresponding to an overlapping network policy with a network policy priority that is the lowest priority relative to the other network services and their corresponding network policy priorities. The construction of the substitute network service chain can be repeated. For example, the construction of the substitute network service change can be an iterative series of attempts to successfully construct a network service chain. The construction can proceed by iteratively removing the network service corresponding to an overlapping network policy with a lowest priority relative to the other remaining network services corresponding to overlapping network policies. The iterative construction can proceed until a viable network service chain results or until no further network service corresponding to an overlapping policy remain to be placed in the network service chain. A viable network service chain can include a service chain that is valid, error free, able to be executed, able to have all the actions satisfied, available for execution, etc. The network services that are iteratively removed can be designated as at least one of not being applied and/or being partially applied. This designation can include flagging the network services for inspection, repair, or removal from the system. In some examples, a network administrator may be alerted that the particular network services have not been applied.

Figure 3:
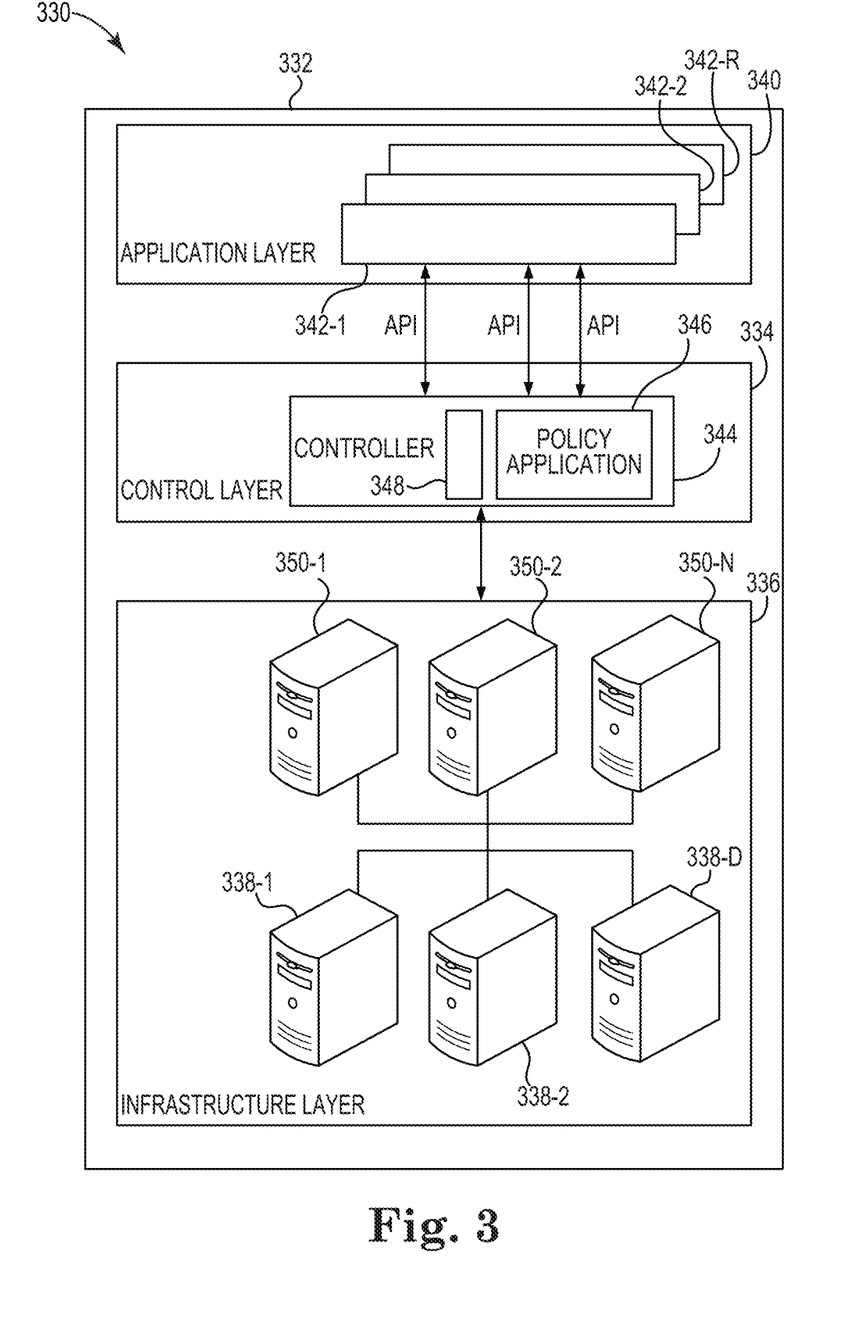
FIG. 3 illustrates an environment network service chain construction according to the present disclosure.

FIG. 3 illustrates an environment 330 according to the present disclosure. The environment 330 can include a client-server network (e.g., a cloud network) 332 that allows endpoint devices 338-1, 338-2, 338-D (e.g., thin clients, portable computers, smartphones, desktop computers, etc.) to access a pool of hosted computing and/or storage resources (e.g., the cloud resources) and virtual network services over a physical network (e.g., a private intranet and/or the public Internet). While illustrated as included in the client-server network 332 it is understood that the endpoint devices 338-1, 338-2, 338-D are on the network 332 and coupled thereto although endpoint devices 338-1, 338-2, 338-D regardless of a physical location of the endpoint devices. Examples, the client-server network 332 can include an SDN-enabled network (e.g., a network that can be managed as an SDN). That is, the environment 330 can include an SDN enabled client-server network (e.g., an SDN). An SDN can include a form of cloud virtualization in which a control layer 334 (e.g., a sub-system that makes decisions that affect cloud traffic) is separated from an infrastructure layer 336 and is implemented as instructions. The control layer 334 can define how cloud traffic is handled in a number of devices.

As illustrated in FIG. 3, the environment 330 can include an application layer 340, a control layer 334, and/or an infrastructure layer 336 in the network 332 (e.g., in the SDN). The application layer 340 can include a number of applications (e.g., programs) 342-1, 342-2, ... 342-R that communicate cloud operating specifications and/or desired cloud behavior to the control layer 334. Applications in the application layer 340 can be implemented by the controller 344 and/or be implemented by other computing devices that interface with controller 344. The application layer 340 can communicate with the control layer 334 via an application instructions interface (API). An API can include a set of routines, protocols, and/or tools that accomplish a specific task and/or are allowed to interact with a specific software component.

The control layer 334 can translate operating specifications provided by the application layer 340 to the infrastructure layer 336. Further, the control layer 334 can include a controller (e.g., an SDN controller) 344 to communicate between the application layer 340 and the infrastructure layer 336. The SDN controller 344 can be hardware and/or instructions. A hardware SDN controller 344 can include a processing resource in communication with a memory resource. The memory resource can include instructions, executable by the processing resource to perform a number of functions described herein. In some examples, the SDN controller 344 can be a discrete device, such as a server.

Also, as illustrated in FIG. 3, the environment 330 can include a network policy application 346 and/or other application 348 embedded in the controller 344, (or implemented by one or more other computing devices interfacing with controller 344), and a number of servers 350-1, 350-2, ..., 350-N (referred to herein as servers 350). The infrastructure layer may include various network devices, such as switches, routers, bridges, wireless access points, and the like, for connecting the servers 350 together in a network. The network policy application 346 can include hardware and/or instructions to detect a portion of a first network policy directing a subset of packets to a first service and a portion of a second network policy directing the subset of packets to a second service and to construct a network service chain of the first service and the second service in an order determined from a priority assigned to the first network policy and a priority assigned to the second network policy, for instance using engines 106 and 108 illustrated in FIG. 1. Additionally and/or alternatively the network policy application 346 can include hardware and/or instructions to detect overlapping applicability among a plurality of network policies directing network traffic to corresponding network services and construct a network service chain of each of the network services corresponding to each of the overlapping plurality of network policies, wherein each of the network services receives an order based on a priority ranking assigned to the corresponding overlapping network policy using modules 218 and 220 illustrated in FIG. 2.

Each of the number of servers 350 can include a number of agents. As used herein, an agent refers to a component of a server that relays messages between the controller 344 and the server and performs and/or provides a specific network service. For example, each of the number of servers 350 can include an agent that performs the services of at least one of an IP address agent, a switching agent, and/or a routing agent. Multiple instances of these agents could be running on each server, however, each agent can be connected to only one controller 344.

Figure 4:
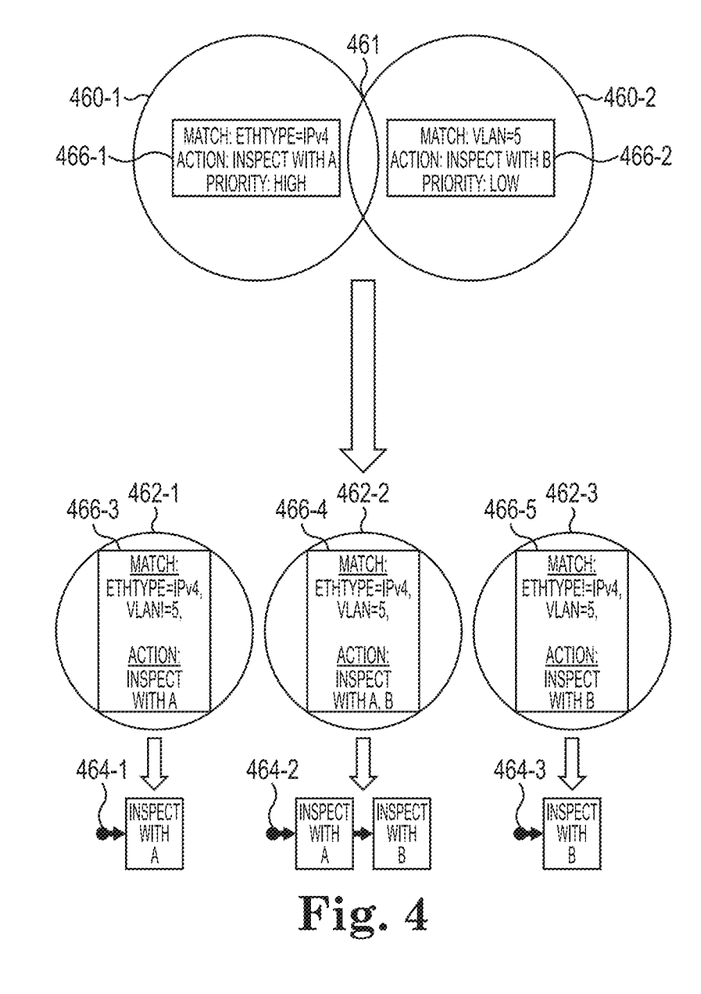
FIG. 4 illustrates an example of network service chain construction, according to the present disclosure.

FIG. 4 illustrates an example of constructing a network service chain from overlapping network policy spaces and orthogonal network policies according to the present disclosure. In FIG. 4, network policy 460-1 and 460-2 are illustrated as having an overlapping space 461. Put another way, network policy 460-1 and network policy 460-2, as illustrated in FIG. 4, has an overlap in application, in that at least part of network policies 460-1 and 460-2 would apply to the same network traffic. For instance, using the intent format, it may be determined that the context of network policy 460-1 overlaps with the context of network policy 460-2, such as both network policy 460-1 and network policy 460-2 apply to network traffic during predefined work hours.

As illustrated in FIG. 4, network policy 460-1 and network policy 460-2 have overlapping space 461, where both network policy 460-1 and network policy 460-2 could apply to network traffic. For instance, network policy 460-1 may apply to "ethtype=IPv4" and network policy 460-2 may apply to "VLAN=5". The overlapping space 461 may refer to the fact that both network policy 460-1 and network policy 460-2 may apply to network traffic that is both ethtype=IPv4 and coming from/going to VLAN 5. Network policies may be considered to be in conflict if they may not both be applied simultaneously to any single packet in the policy space where they overlap. For instance, network policy 460-1 and network policy 460-2 may be considered to be in conflict if they may not both be applied simultaneously to any single packet in overlapping space 461.

To resolve a conflict between network policies, the overlapping network policies may be divided into a plurality of orthogonal policies 462-1, 462-2, and 462-3. Put another way, in response to detecting an overlap in application between a first network policy and a second network policy, overlapping first network policy and second network policy can be separated into a plurality of orthogonal policies 462-1, 462-2, and 462-3. As used herein, an orthogonal network policy (e.g., 462-1, 462-2, 462-3) refers to a network policy which has a policy space which does not overlap with any other orthogonal network policy (e.g., 462-1, 462-2, 462-3). Also, a policy space can include a set of source endpoint identifiers, a set of destination endpoint identifiers, a classifier, and a context. Two network policies can be orthogonal if there are no possible packets which would apply to both network policies.

In each orthogonal policy 462-1, 462-2, 462-3 space an action and/or actions may be associated with the orthogonal policy 462-1, 462-2, 462-3 space. These actions can be actions derived from actions associated with the corresponding portions of the network policies 460-1 and 460-2. The actions can include an action such as "redirect", "inspect with", "audit", and "block", and/or a service such as a logging service, and/or an inspecting service, associated with an action. In the orthogonal policy space 462-2 corresponding to the overlapping space 461 of the network policies 460-1 and 460-2 a plurality of actions and/or services can be specified corresponding to the actions and services of the overlapping space 461 of the network policies 460-1 and 460-2. For illustration purposes the action specified in network policy 460-1 can include "inspect with service A" and the action specified in network policy 460-2 can include "inspect with service B". The overlapping space 461 of the network policies 461 can, therefore, include the actions "inspect with service A" and "inspect with service B". Therefore, the orthogonal policy space 462-2 can include the actions "inspect with service A" and "inspect with service B".

Constructing a network service chain (e.g., 464-1, 464-2, 464-3, etc.) can include virtually chaining the actions and/or services specified in the overlapping portion (e.g., 461) of the network policies 460-1 and 460-2 together into an executable script (e.g., service chain 464-2). The actions and/or services can be ordered within the script according to a priority assigned to the network policy/policies whence each action and/or service was derived from. In continuing the example above, the orthogonal policy space 462-2 can include the actions "inspect with service A" and "inspect with service B". The service chain (e.g., 464-2) constructed therefrom can order the "inspect with service A" and "inspect with service B" actions within the service chain (e.g., 464-2) according to the priority assigned to the network policies 460-1 and 460-2 serving as the original source of those actions. In this example, the priority of network policy 460-1 is high and the priority of network policy 460-2 is low, so the action "inspect with service A" derived from network policy 460-1 will be ordered earlier in the service chain 464-2 than the action "inspect with service B" derived from network policy 460-2.

The matching criteria for a policy, the network action for a policy, and/or the priority assigned to a policy can be part of a parameter set 466-1, 466-2, 466-3, 466-4, 466-5 associated with each policy space (e.g., network policy 460-1, network policy 460-2, orthogonal policy 462-1, orthogonal policy 462-2, orthogonal policy 462-3). Constructing the network service chain (e.g., 464-1, 464-2, 464-3, etc.) can be performed by analyzing these parameter sets 466-1, 466-2, 466-3, 466-4, 466-5.

Figure 5:
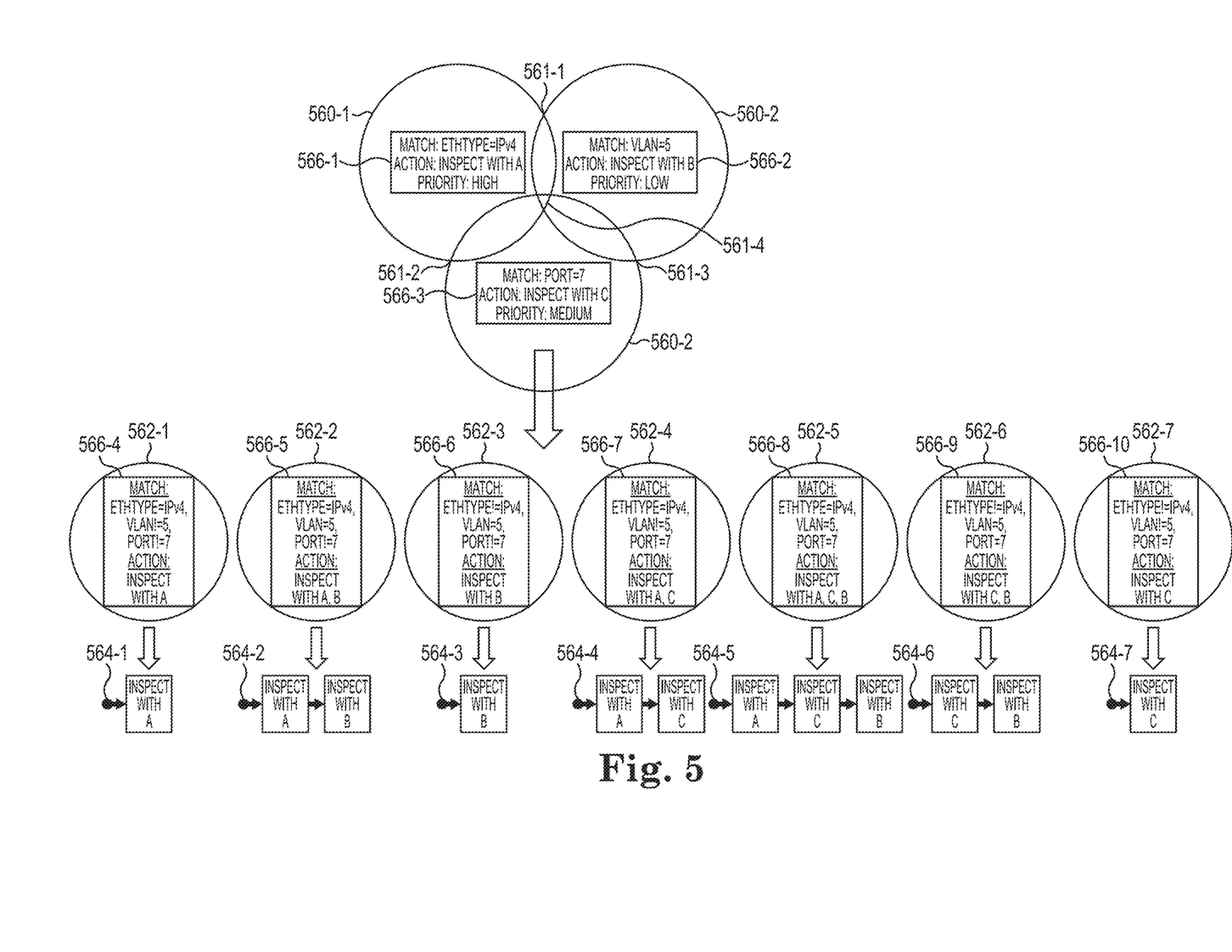
FIG. 5 illustrates an example of network service chain construction, according to the present disclosure.

FIG. 5 illustrates an example illustrates an example of constructing a network service chain from overlapping network policy spaces and orthogonal network policies according to the present disclosure. In FIG. 5, network policy 560-1, 560-2, and 560-3 are illustrated as having a plurality of overlapping spaces 561-1, 561-2, 561-3, and 561-4. Put another way, network policies 560-1, 560-2, and 560-3, as illustrated in FIG. 5, have an overlap in application, in that at least part of network policies 560-1, 560-2, and 560-3 would apply to the same network traffic. For instance, using the intent format, it may be determined that the context of network policy 560-1 overlaps with the context of network policy 560-2 and the context of network policy 560-3, such as network policy 560-1, network policy 560-2 and network policy 560-3 apply to network traffic during predefined work hours.

As illustrated in FIG. 5, network policy 560-1, network policy 560-2 and network policy 560-3 have overlapping spaces 561-1, 561-2, 561-3, and 561-4, where more than one of the network polices 560-1, 560-2, 560-3 could apply to network traffic. For instance, network policy 560-1 may apply to "ethtype=IPv4", network policy 560-2 may apply to "VLAN=5", and network policy 560-3 may apply to "port=7". The overlapping spaces 561-1, 561-2, 561-3, and 561-4 can refer to the fact that, for example, policy 560-1, 560-2 and 560-3 may apply to network traffic that is ethtype=IPv4 and coming from/going to VLAN5 and port 7.

Policy conflicts between network policies can be resolved by dividing the overlapping policies into a plurality of orthogonal policies 562-1, 562-2, 562-3, 562-4, 562-5, 562-6, and 562-7, as described in more detail with regard to FIG. 4. In the orthogonal policy spaces 562-2, 562-4, 562-5, and 562-6 corresponding to overlapping spaces 561-1, 561-2, 561-4, and 561-3, respectively, a plurality of actions and/or services can be specified corresponding to the actions and services of the overlapping spaces 561-1, 561-2, 561-4, and 561-3 of the network policies 560-1, 560-2, and 560-3. For illustration purposes the action specified in network policy 560-1 can include "inspect with service A", the action specified in network policy 560-2 can include "inspect with service B", the action specified in the network policy 560-3 can include "inspect with service C". The overlapping policy space 561-1 of the network policies can, therefore, include the actions "inspect with service A" and "inspect with service B". The overlapping policy space 561-2 of the network policies can, therefore, include the actions "inspect with service A" and "inspect with service C". The overlapping policy space 561-3 of the network polices can include the actions "inspect with service B" and "inspect with service C". The overlapping policy space 561-4 of the network policies can include the actions "inspect with service A", "inspect with service B", and "inspect with service C". Therefore, the orthogonal policy spaces corresponding to each of the overlapping policy spaces can include the same actions.

Constructing a network service chain can include constructing the plurality of network service chains 564-1, 564-2, 564-3, 564-4, 564-5, 564-6, and 564-7 from the corresponding orthogonal policies 562-1, 562-2, 562-3, 562-4, 562-5, 562-6, and 562-7. Constructing the plurality of network service chains 564-1, 564-2, 564-3, 564-4, 564-5, 564-6, and 564-7 can include virtually chaining the actions and/or services specified in the overlapping portions (e.g., 561-1, 561-2, 561-3, 561-4) of the network policies 560-1, 560-2, and 560-3 together into an executable script (e.g., service chains 564-2, 564-4, 562-5, 562-6). The actions and/or services can be ordered within the script according to a priority assigned to the network policy/policies whence each action and/or service was derived from. In continuing an example from above, the orthogonal policy space 564-4 can include the actions "inspect with service A", "inspect with service B", and "inspect with service C". The service chain (e.g., 564-5) constructed therefrom can order the "inspect with service A", "inspect with service B", and "inspect with service C" actions within the service chain (e.g., 564-5) according to the priority assigned to the network policies 560-1, 560-2, and 560-3 serving as the original source of those actions. In this example, the priority of network policy 560-1 is high, the priority of network policy 560-2 is low, and the priority of network policy 560-3 is medium so the action "inspect with service A" derived from network policy 560-1 will be ordered earlier in the service chain 564-5 than the action "inspect with service C" derived from network policy 560-3 and the action "inspect with service C" will be ordered earlier in the service chain 564-5 than the action "inspect with service B" derived from network policy 560-2.

The matching criteria for a policy, the network action for a policy, and the priority assigned to a policy can be part of a parameter set 566-1, 566-2, 566-3, 566-4, 566-5, 566-6, 566-7, 566-8, 566-9, 566-10 (herein referred to collectively as parameter sets 566) associated with each policy space (e.g., network policy 560-1, network policy 560-2, network policy space 560-3, orthogonal policy 562-1, orthogonal policy 562-2, orthogonal policy 562-3, orthogonal policy 562-4, orthogonal policy 562-5, orthogonal policy 562-6, orthogonal policy 562-7). Constructing the network service chains 564-1, 564-2, 564-3, 564-4, 564-5, 564-6, 564-7, etc. can be performed by analyzing these parameter sets 566.

Figure 6:
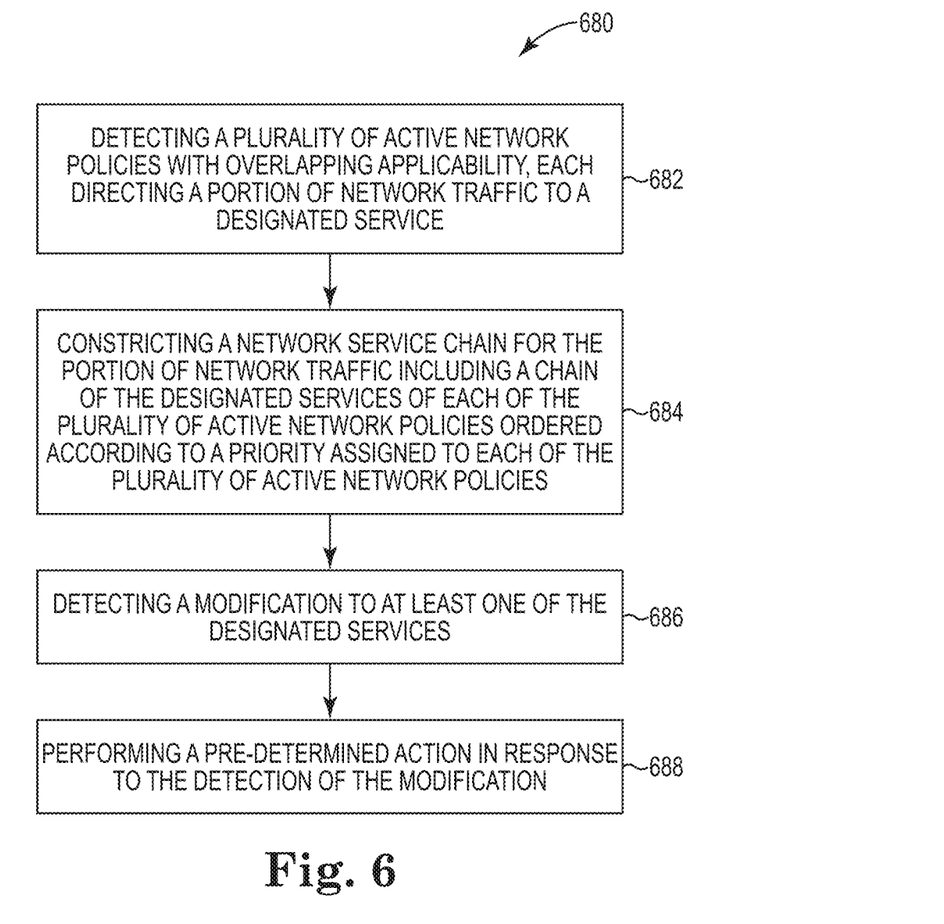
FIG. 6 illustrates a flow chart of an example method for network service chain construction according to the present disclosure.

FIG. 6 illustrates a flowchart of an example method 680 for network service chain construction according to the present disclosure. The example method can be implemented in the environment 330 illustrated in FIG. 3, using the system 100 illustrated in FIG. 1 and/or the computing device 210 illustrated in FIG. 2.

At 682, the method 680 can include detecting a plurality of active network policies with overlapping applicability, wherein each of the plurality of active network policies directs a portion of network traffic to a designated service of a plurality of services. As discussed in relation to FIG. 1 and FIG. 2, detecting the plurality of active network policies with overlapping applicability can include detecting portions of a plurality of active network policies that that would apply to a particular packet within the network traffic.

At 684, the method 680 can include constructing a network service chain for the portion of network traffic including a chain of the designated services of each of the plurality of active network policies ordered according to a priority assigned to each of the plurality of active network policies. Constructing the network service chain can include virtually chaining actions and/or services in an executable chain wherein the actions and/or designated services are ordered within that chain according to the priority of the active network policies whence they and/or corresponding orthogonal network policies were derived.

At 686, the method 680 can include detecting a modification to at least one of the designated services. Detecting the modification can include detecting a failure of at least one instance of a designated service. Detecting a failure of an instance can include detecting, via an SDN controller, that an instance of a service is unavailable, offline, has failed, and/or lacks the resources to execute. In another example, detecting the modification can include detecting an addition of at least one instance of the designated services.

At 688, the method 680 can include performing a pre-determined action in response to detection of the modification. For example, each network policy and/or orthogonal policy can specify a failure action. A failure action can refer to an action that would be imposed in the event that a requested service is not available and/or cannot be allocated into the construction of the network service chain. A failure action can include action instructions to effect a dynamic and near real/time response to a service failure and/or network resource limitation. In the event that a requested service is not available and/or the service failed to be allocated into a service chain an iterative method of removing actions and/or service from the network service chain can be employed. For example, in the event that a one or more requested services are not available and/or the requested services fail to be allocated into the service chain the unavailable services and/or the action specifying the unavailable services can be iteratively removed from the service chain until a viable service chain is reached. At the point in time when the requested service is deemed available and/or when server resources have become available to allow utilization of the service, an iterative service chain allocation mechanism can be retriggered to allocate the requested service into a service chain. In an example detecting the modification includes detecting a failure of at least one instance of the designated services, performing the pre-determined action includes at least one of redirecting the portion of network traffic and blocking the network traffic.

For example, the following service request can be generated: "inspect with service A, then inspect with service C, and then inspect with service B, then final destination". If a server that services an instance of service C has failed, a failure action can be specified. In other words, an instruction regarding what to do to handle the loss of requested service C can be generated. The failure action can include instructions for actions such as "block", "allow", and/or "replace" with a replacement service. For example a failure action can specify that in the event of a failure the failed service C should be replaced with a "block". The resulting service chain can be "inspect with service A, then block". That is, a subset of packets can be allowed to traverse one or more service of the service chain ordered earlier than the failed service before being blocked. Additionally and/or alternatively the resulting service chain can be "block". That is, a subset of packets can be blocked before entering any service of the service chain. In another example, a failure action can specify that in the event of a failure the failed service C should be replaced with an "allow". The resulting service chain can be "inspect with service A, inspect with service B, final destination". In yet another example, a failure action can specify that in the event of a failure the failed service C should be "replaced with service D". Service D can be a replacement service. A replacement service can have an identical function, a similar function, produce an identical result, produce a similar result, and/or be completely different from the service which it is replacing. The resulting service chain can be "inspect with A, inspect with D, inspect with B, final destination". The failure action can be dynamically applied in that once failed service C becomes available and/or other instances of service C become available, the service chain can be modified to reincorporate the service. In this manner, construction of the service chain can dynamically respond to the availability of requested services. The failure action can be specified by a network administrator and/or a requesting application and incorporated into the network policies.

In another example, where detecting the modification includes detecting an addition of at least one instance of the designated services, the pre-determined action can include modifying the network service chain to distribute the portion of network traffic among a plurality of instances of the at least one of the designated services. In this manner, network traffic can be dynamically balanced across resource as they come on line and/or fail.

For example, the following service request can be included in a network service chain: "inspect with service A, then inspect with service C, and then inspect with service B". However, a new instance of service C can come online and/or be discovered (e.g., via an SDN controller). Upon discovering the new instance, network traffic can be balanced over the original instance/instances of service C and the new instance of service C.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "D", and "R", particularly with respect to reference numerals in the drawings, indicate that a number of the particular feature and/or component so designated can be included with a number of examples of the present disclosure. The designators "N", "D", and "R" can refer to a same feature and/or component, or different features and/or components.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for constructing network service chain based on network policies, the system comprising:
   a processor;
   a detection engine to:
      detect a plurality of active network policies with overlapping applicability, wherein the plurality of active network policies comprises a portion of a first network policy directing a subset of packets to a first service and a portion of a second network policy directing the subset of packets to a second service, wherein the portion of the first network policy and a portion of a third network policy direct the subset of packets to a common service, and wherein the active network policies with overlapping applicability comprises multiple active network policies that apply to a single network packet;
      specify a network policy priority that defines an order that the plurality of active network policies are applied; and
      generate a set of orthogonal network policies based, in part on the first network policy and the second network policy, wherein the set of orthogonal network policies perform the functions of the overlapping active network policies in a non-overlapping manner; and
   a construction engine communicatively coupled with the detection engine, the construction engine to:
      construct a network service chain utilizing the set of orthogonal network policies corresponding to the subset of packets to provide the first service and the second service in a non-overlapping manner, wherein conflicts between actions within the orthogonal network policies are resolved based on a network policy priority, wherein the priority assigned to the first network policy and the priority assigned to the second network policy are associated with a corresponding application, wherein the first network policy and the second network policy are ordered according to the network policy priority, wherein the construction of the network service chain includes constructing a substitute network service chain, in response to a determination that the constructed network service chain is not executable, wherein the substitute network service chain is constructed based a network policy priority that is the lowest priority relative to the other network services and wherein the construction of the substitute network service chain includes iterative series of attempts to successfully construct the substitute network service chain until no further network service corresponding to the overlapping policy remain to be placed in the network service chain.

2. The system of claim 1, wherein the first service is ordered earlier in the network service chain relative to the second service, based on the first network policy having a higher assigned priority relative to the second network policy.

3. The system of claim 1, wherein the order of the common service in the network service chain is determined from the highest priority assigned among the first network policy and the third network policy.

4. The system of claim 1, further comprising a distribute engine to distribute the subset of packets among a plurality of instances of the first service.

5. The system of claim 1, wherein a network administrator specifies the order corresponding with the application priority.

6. The system of claim 1, further comprising:
   specify a network policy priority that defines a second order of the first network policy and the second network policy.

7. The system of claim 1, wherein the network policy priority is normalized across applications, including the corresponding application.

8. The system of claim 1, wherein the network service chain is ordered based on an order of each network policy in the overlapping active network policies and an assigned priority of each network policy in the overlapping active network policies.

9. The system of claim 1, wherein the network policy priority includes high, medium, and low priorities.

10. A non-transitory computer readable medium storing instructions for constructing network service chain based on network policies and executable by a processing resource to cause a computer to:
detect a plurality of active network policies with overlapping applicability among a plurality of network policies directing network traffic to corresponding network services, wherein a portion of a first network policy and a portion of a third network policy direct the network traffic to a common service, and wherein the active network policies with overlapping applicability comprises multiple active network policies that apply to a single network packet;
specify a network policy priority that defines an order that the multiple active network policies are applied;
generate a set of orthogonal network policies based, in part on the first network policy and the second network policy, wherein the set of orthogonal network policies perform the functions of the overlapping active network policies in a non-overlapping manner; and
construct a network service chain utilizing the set of orthogonal network policies corresponding to the subset of packets to provide the first service and the second service in a non-overlapping manner, wherein conflicts between actions within the orthogonal network policies are resolved based on a network policy priority, wherein the priority assigned to the first network policy and the priority assigned to the second network policy are associated with a corresponding application, wherein the first network policy and the second network policy are ordered according to the network policy priority, wherein the construction of the network service chain includes constructing a substitute network service chain, in response to a determination that the constructed network service chain is not executable, wherein the substitute network service chain is constructed based a network policy priority that is the lowest priority relative to the other network services and wherein the construction of the substitute network service chain includes iterative series of attempts to successfully construct the substitute network service chain until no further network service corresponding to the overlapping policy remain to be placed in the network service chain.

11. The medium of claim 10, further comprising instructions executable by a processing resource to cause the computer to construct a substitute network service chain, in response to a determination that the constructed network service chain was unsuccessful, and by iteratively removing a network service associated with a lowest priority relative to the remaining network services until a viable network service chain results.

12. The medium of claim 11, wherein the removed network service is designated as at least one of not having been applied and having been partially applied.

13. The medium of claim 10, further comprising instructions executable by a processing resource to cause the computer to construct a substitute network service chain, in response to a determination that the constructed network service chain was unsuccessful, by iteratively removing a network service associated with a lowest priority relative to the remaining network services until no network services corresponding to an overlapping policy remain.

14. A method of constructing network service chain based on network policies, the method comprising:
detecting a plurality of active network policies with overlapping applicability, wherein each of the plurality of active network policies directs a portion of network traffic to a designated service of a plurality of services, wherein a portion of a first network policy and a portion of a third network policy direct a subset of packets to a common service, and wherein active network policies with overlapping applicability comprises multiple active network policies that apply to a single network packet; specify a network policy priority that defines an order that the multiple active network policies are applied;
generating a set of orthogonal network policies based in part on the first network policy and a second network policy, wherein the set of orthogonal network policies perform the functions of the overlapping active network policies in a non-overlapping manner; and
constructing a network service chain utilizing the set of orthogonal network policies corresponding to the subset of packets to provide the first service and the second service in a non-overlapping manner, wherein conflicts between actions within the orthogonal network policies are resolved based on a network policy priority;
detecting a modification to at least one of the designated services; and
performing a pre-determined action in response to the detection of the modification, wherein the priority assigned to the first network policy and the priority assigned to the second network policy are associated with a corresponding application, and wherein the first network policy and the second network policy are ordered according to the network policy priority, wherein the pre-determined action in response to the detection of the modification includes constructing a substitute network service chain, in response to a determination that the constructed network service chain is not executable, wherein the substitute network service chain is constructed based the network policy priority that is the lowest priority relative to the other network services and wherein the construction of the substitute network service chain includes iterative series of attempts to successfully construct the substitute network service chain until no further network service corresponding to the overlapping policy remain to be placed in the network service chain.

15. The method of claim 14, wherein detecting the modification includes detecting a failure of at least one instance of the designated services.

16. The method of claim 15, wherein performing the pre-determined action includes at least one of allowing the portion of network traffic, blocking the network traffic, and replacing the failed at least one instance of the designated service with a replacement service.

17. The method of claim 14, wherein detecting the modification includes detecting an addition of at least one instance of the designated services.

18. The method of claim 17, wherein performing the pre-determined action includes modifying the network service chain to distribute the portion of network traffic among a plurality of instances of the at least one of the designated services.

* * * * *